No. 832,472. PATENTED OCT. 2, 1906.
G. A. FRIEDRICHS.
DYEING APPARATUS.
APPLICATION FILED FEB. 23, 1906.

Witnesses
Wm. C. Dashiell
N. C. Healy

Inventor
G. A. Friedrichs
James J. Shuey
Attorney

UNITED STATES PATENT OFFICE.

GUSTAVE A. FRIEDRICHS, OF WOONSOCKET, RHODE ISLAND, ASSIGNOR OF ONE-HALF TO CHARLES A. PROULX, OF WOONSOCKET, RHODE ISLAND.

DYEING APPARATUS.

No. 832,472.   Specification of Letters Patent.   Patented Oct. 2, 1906.

Application filed February 23, 1906. Serial No. 302,585.

*To all whom it may concern:*

Be it known that I, GUSTAVE A. FRIEDRICHS, a citizen of the United States, residing at Woonsocket, in the county of Providence and State of Rhode Island, have invented new and useful Improvements in Dyeing Apparatus, of which the following is a specification.

My invention pertains to apparatus for use in the practice of dyeing; and it has for one of its objects to provide an extractor through the medium of which dyed material may be expeditiously and thoroughly dried.

Another object of the invention is the provision of an apparatus susceptible of being used alternately as an extractor and as an apparatus for facilitating the dyeing of material.

Other objects of the invention will be fully understood from the following description and claims when the same are read in connection with the accompanying drawings, forming part of this specification, in which—

Figure 1:
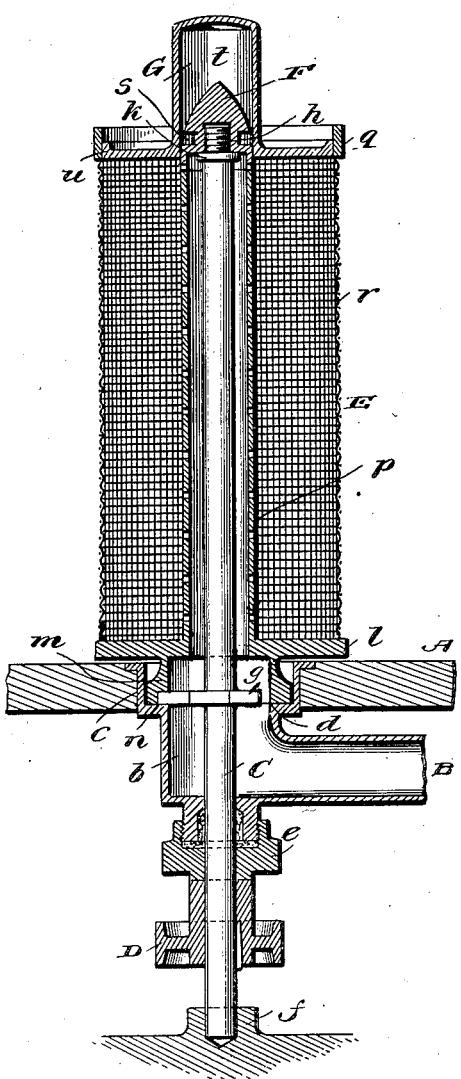
Figure 2:
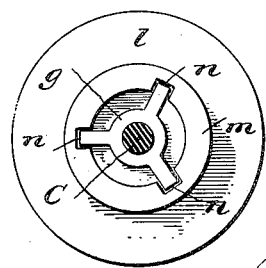

Figure 1 is a vertical section of so much of the apparatus as is necessary to illustrate the present and preferred embodiment of my invention. Fig. 2 is a horizontal section taken in a plane immediately below the spider on the spindle looking upwardly and showing the relative arrangement of the said spider and the base of the basket for holding the material to be dried or dyed.

Similar letters designate corresponding parts in both views of the drawings, referring to which—

A is the bottom of a dye tub or vat, and B is a conduit adapted to be connected with a source of hot-air supply or else with a source of dye-liquor supply, as presently pointed out in detail, and having an upwardly-reaching portion $b$, which is of comparatively large diameter, so as to assure the supply of an adequate volume of hot air or dye liquor to the basket, and is disposed in an opening $c$ in the bottom A, as shown in Fig. 1. In its inner side the said upwardly-reaching portion of the conduit B is provided with a ledge or shoulder $d$, and at its lower end it is equipped with a stuffing-box $e$ for a purpose which will presently appear.

C is a spindle stepped at its lower end in a suitable bearing $f$ and extending upwardly through the stuffing-box $e$ and the upwardly-reaching portion $b$ of the conduit B and having a spider $g$ at an intermediate point of its length and also having an upper threaded end $h$ and a shoulder $k$ immediately below said threaded end.

D is a band-pulley keyed or otherwise fixed on the spindle C and located below the stuffing-box $e$.

E is the basket for holding the material to be dried or dyed, F a nut for holding the said basket down in proper working position, and G a cover for the basket. The said basket E is made up of an annular base $l$, disposed slightly above the tub-bottom A and having a depending annular flange $m$, in the lower end of which are recesses $n$, positioned to receive the arms of the spider $g$, Fig. 2, a foraminated tube $p$, fixed to and rising from the base $l$ and open at its lower and upper ends, an upper ring $q$, and a reticulated side wall $r$, preferably of fine-wire netting, interposed between and permanently connected to the base $l$ and the ring $q$.

The nut F is threaded to receive the upper threaded end $h$ of the spindle C and is arranged to bear on the shoulder $k$ of the spindle and rest immediately above the upper end of the foraminated tube $p$ of the basket, so as to hold the basket against raising, and this without undue friction. Said nut is preferably provided in its side with a plurality of sockets $s$, designed to receive a spanner or wrench (not shown) when the nut is to be turned on or off the spindle.

The cover G is made up of a central upright tubular portion $t$, which is of a size in cross-section to snugly receive the foraminated tube $p$ and is closed at its upper end, and a flange $u$, which surrounds the lower end of the tubular portion and is of a diameter to snugly occupy the basket E, as shown at the top of Fig. 1. In virtue of this it is apparent that the cover G may be adjusted vertically on the tube $p$ and in the basket E, so as to adapt the cover to the quantity of material in the basket. It is also apparent that as the cover is moved downward to carry its flange $u$ against the material in the basket its tubular portion $t$, sliding over the tube $p$, will serve as a stop to the hot air or dye liquor, as the case may be, and compel the same to pass through the material instead of up and out of the tube $p$ at a point above the material, as it would do were no cover provided. This assured passage of the hot air or dye liquor through the material instead of above the same materially accelerates the drying of the material when the apparatus is used as an extractor and facilitates the thorough dyeing of the material when the apparatus is used as a dyeing apparatus.

By virtue of the basket E being arranged and held between the nut F and the spider $g'$ on spindle C it will be observed that when the spindle is rotated the basket E will also be rotated, and it will also be observed that when the basket E is rotated at a high rate of speed and an adequate quantity of hot air is supplied to the conduit B drying of the material in the basket will be quickly and thoroughly effected.

When my novel apparatus is to be used as a dyeing apparatus, the spindle C is left idle and dye liquor is supplied to the material in the basket E from the interior of the tub or vat or else from the conduit B, which of course in that case must be connected with a pump or other means for supplying dye liquor.

It will be gathered from the foregoing that notwithstanding the two purposes for which my apparatus may be employed the same is simple and inexpensive in construction and embodies no delicate parts such as are liable to get out of order after a short period of use.

I have entered into a detailed description of the construction and relative arrangement of the parts embraced in the present and preferred embodiment of my invention with a view of imparting a definite understanding of the said embodiment. I do not desire, however, to be understood as confining myself to the said specific construction and relative arrangement of parts, as such changes or modifications may be made in practice as fairly fall within the scope of my claimed invention.

Having described my invention, what I claim, and desire to secure by Letters Patent, is—

In an apparatus for the purpose described, the combination of a tub or vat having an opening in its bottom, a conduit connected with said opening, a spindle extending through the conduit and into the tub or vat and having a spider fixed thereon and located in the conduit, a basket having a foraminated tube receiving the spindle and a base resting against and engaging the spider of the spindle and also having an open-work side, a nut mounted on the spindle and resting against the end of the foraminated tube of the basket, and a movable cover which is exactly contained in the basket and comprises a tubular portion closed at its outer end and resting over the nut and the foraminated tube of the basket, and a flange surrounding the tubular portion.

In testimony whereof I have hereunto set my hand in presence of two subscribing witnesses.

GUSTAVE A. FRIEDRICHS.

Witnesses:
GEO. W. SPAULDING,
EDGAR L. SPAULDING.